(12) United States Patent
Zhao et al.

(10) Patent No.: US 10,997,099 B2
(45) Date of Patent: May 4, 2021

(54) I/O REQUEST PROCESSING METHOD IN VIRTUAL MACHINE, DEVICE AND COMPUTER READABLE MEDIUM

(71) Applicant: BEIJING BAIDU NETCOM SCIENCE AND TECHNOLOGY CO., LTD., Beijing (CN)

(72) Inventors: Rui Zhao, Beijing (CN); Xun Ni, Beijing (CN); Yongji Xie, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 137 days.

(21) Appl. No.: 16/167,197

(22) Filed: Oct. 22, 2018

(65) Prior Publication Data
US 2019/0129873 A1    May 2, 2019

(30) Foreign Application Priority Data
Oct. 26, 2017   (CN) .......................... 201711018956.4

(51) Int. Cl.
G06F 9/455   (2018.01)
G06F 9/46    (2006.01)
G06F 13/20   (2006.01)

(52) U.S. Cl.
CPC ............ *G06F 13/20* (2013.01); *G06F 9/4555* (2013.01); *G06F 9/45558* (2013.01); *G06F 2009/45579* (2013.01); *G06F 2009/45583* (2013.01)

(58) Field of Classification Search
CPC .... G06F 13/20; G06F 9/4555; G06F 9/45558; G06F 2009/45579; G06F 2009/45583
See application file for complete search history.

(56) References Cited

U.S. PATENT DOCUMENTS

| | | | |
|---|---|---|---|
| 7,827,362 B2* | 11/2010 | Passerini | G06F 3/0656 711/154 |
| 2011/0258391 A1* | 10/2011 | Atkisson | G06F 12/0804 711/118 |

(Continued)

FOREIGN PATENT DOCUMENTS

| CN | 101706742 A | 5/2010 |
|---|---|---|
| CN | 101706757 A | 5/2010 |

(Continued)

OTHER PUBLICATIONS

Kartik Gopalan, Multi-hypervisor Virtual Machines: Enabling an Ecosystem of Hypervisor-level Services, Jun. 2017, pp. 235-249. https://www.usenix.org/system/files/conference/atc17/atc17-gopalan.pdf (Year: 2017).*

(Continued)

*Primary Examiner* — Mongbao Nguyen
(74) *Attorney, Agent, or Firm* — Ladas & Parry, LLP

(57) ABSTRACT

An I/O request processing method in a virtual machine, a device and a computer readable medium are provided. When a backend device of a Guest kernel begins to process an I/O request chain submitted by a frontend device of the Guest kernel into a shared I/O processing memory, the method obtains a starting position of the I/O request chain in the I/O processing memory; according to the starting position of the I/O request chain, sets an element corresponding to the starting position of the I/O request chain in an I/O state array as a value different from initial values of all positions; and upon finishing processing the I/O request chain, sets an element corresponding to the starting position of the I/O request chain in an I/O request state array as a value identical with initial values.

9 Claims, 6 Drawing Sheets

(56) References Cited

U.S. PATENT DOCUMENTS

| | | | | | |
|---|---|---|---|---|---|
| 2014/0317619 | A1* | 10/2014 | Tajima | ................ | G06F 9/45558 718/1 |
| 2015/0046922 | A1* | 2/2015 | Allen | ........................ | G06F 8/63 718/1 |
| 2016/0147556 | A1* | 5/2016 | Hu | ...................... | G06F 9/45558 718/1 |
| 2019/0347125 | A1* | 11/2019 | Sankaran | ................... | G06F 9/48 |
| 2019/0370049 | A1* | 12/2019 | Gopalan | ............. | G06F 9/45558 |
| 2020/0174819 | A1* | 6/2020 | Dong | ................. | G06F 9/45558 |

FOREIGN PATENT DOCUMENTS

| | | |
|---|---|---|
| CN | 103984536 A | 8/2014 |
| CN | 105556473 A | 5/2016 |
| CN | 106970821 A | 7/2017 |
| KR | 20130131812 A | 12/2013 |

OTHER PUBLICATIONS

Heeseung Jo, Transparent Fault Tolerance of Device Drivers for Virtual Machines, 2010, pp. 1466-1477. https://ieeexplore.ieee.org/stamp/stamp.jsp?tp=&arnumber=5432158&isnumber=5586714 (Year: 2010).*

Microsoft, Example I/O Request—The details, Jun. 2017, pp. 1-5. https://docs.microsoft.com/en-us/windows-hardware/drivers/kernel/example-i-o-request--the-details (Year: 2017).*

Microsoft, Understanding the Windows I/O System, 2012 https://www.microsoftpressstore.com/articles/article.aspx?p=2201309&seqNum=3 (Year: 2012).*

First office action and search report from CN app. No. 201711018956.4, dated Feb. 14, 2020 with English translation from Global Dossier.

Notice of Allowance from CN app. No. 201711018956.4, dated Mar. 12, 2019, with English translation from Global Dossier.

* cited by examiner

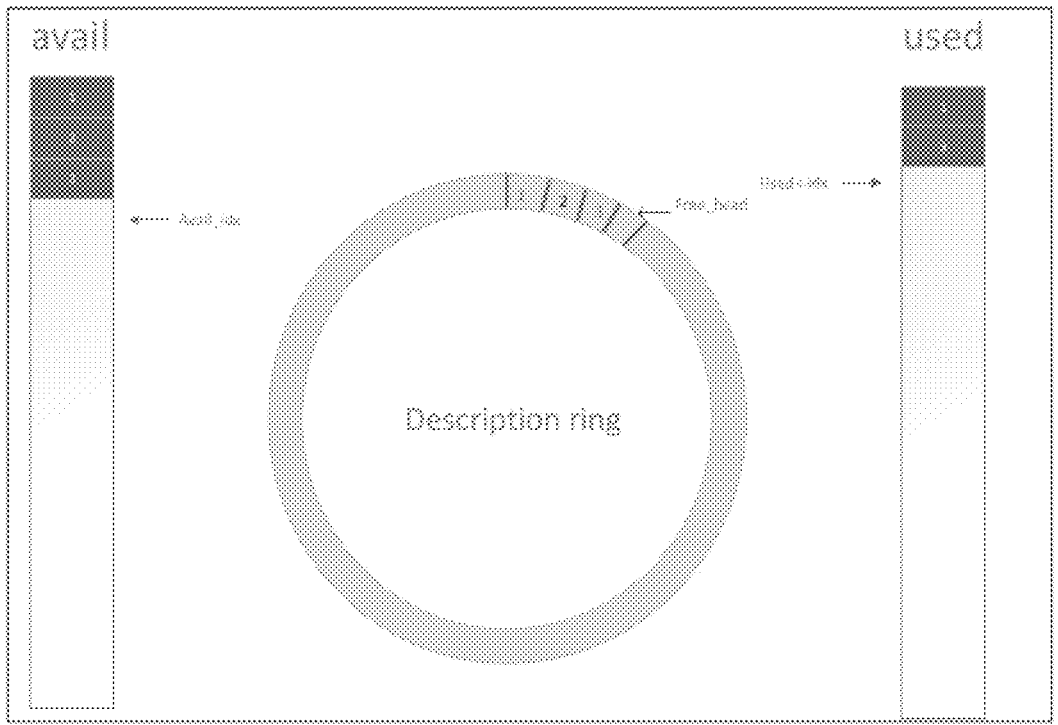

Fig.3

When a backend device of a Guest kernel begins to process an I/O request chain submitted by a frontend device of the Guest kernel into a shared I/O processing memory, obtain a starting position of the I/O request chain from the I/O processing memory — 100

According to the starting position of the I/O request chain, set an element corresponding to the starting position of the I/O request chain in an I/O state array as a value different from initial values of all positions — 101

Upon finishing processing the I/O request chain, set an element corresponding to the starting position of the I/O request chain in an I/O request state array as a value identical with initial values — 102

Fig. 4

I/O REQUEST PROCESSING METHOD IN VIRTUAL MACHINE, DEVICE AND COMPUTER READABLE MEDIUM

The present application claims the priority of Chinese Patent Application No. 201711018956.4, filed on Oct. 26, 2017, with the title of "I/O request processing method in virtual machine, device and computer readable medium". The disclosure of the above applications is incorporated herein by reference in its entirety.

FIELD OF THE DISCLOSURE

The present disclosure relates to the technical field of computer application, and particularly to an I/O request processing method in a virtual machine, a device and a computer readable medium.

BACKGROUND OF THE DISCLOSURE

A Hypervisor is an intermediate software layer running between a physical server and an operating system, whereas Virtio is an abstract layer located on a device in a paravirtualized Hypervisor and may also be called a paravirtualized abstract layer.

Virtio provides a general-purpose communication interface for a frontend and a backend of a Guest kernel. The frontend of the Guest kernel and the rear end of the Guest kernel may specifically perform data transmission through a Virtio-ring (briefly called Vring) struct in Virtio. Specifically, first, the frontend of the Guest kernel writes data in the Virtio-ring (briefly called Vring) struct of the Virtio, then Hypervisor, as the backend of the Guest kernel, performs read/write for the device according to data, and notifies the frontend of the Guest kernel upon completion of read/write. As technologies develop, the Hypervisor gradually puts forward Vhost technology. The Vhost technology may allow the rear end of the Guest kernel to interact with the frontend of the Guest kernel directly through the Virtio-ring, and reduce repeated copying of data from a user state to a kernel state. The Vhost technology may allow the backend of the Guest kernel to be located in the user state, and therefore may be called Vhost-user (virtual machine backend user state) technology. Since the Vhost technology may allow the backend of the Guest kernel to be located in the user state, it is possible to increase flexibility of development of the backend program while reducing crash probability. At present, widely-used Guest kernel backend programs include dpdk, spdk and so on. These programs may improve performance of the network and Input/Output (I/O) by one or more times.

However, when the backend of the Guest kernel and frontend of the Guest kernel in the current Vhost technology use Virtio for communication, if a bug appears in the user-state program of the backend of the Guest kernel or abnormal interruptions are caused by a repairer's mis-operations, this causes the blocking upon I/O read/write. Since the backend of the Guest kernel does not record a processing state, information asynchronization appears at the backend of the Guest kernel and the frontend of the Guest kernel after information is interacted again after the blocking, so that it is impossible to continue to process subsequent I/O requests so that the I/O processing is hung.

SUMMARY OF THE DISCLOSURE

The present disclosure provides an I/O request processing method in a virtual machine, a device and a computer readable medium, to ensure that the backend of the Guest kernel is stuck and then restart to continue to processing subsequent I/O requests and prevent the I/O processing from being hung.

The present disclosure provides an I/O request processing method in a virtual machine, the method comprising:

when a backend device of a Guest kernel begins to process an I/O request chain submitted by a frontend device of the Guest kernel into a shared I/O processing memory, obtaining a starting position of the I/O request chain in the I/O processing memory;

according to the starting position of the I/O request chain, setting an element corresponding to the starting position of the I/O request chain in an I/O state array as a value different from initial values of all positions;

upon finishing processing the I/O request chain, setting an element corresponding to the starting position of the I/O request chain in an I/O request state array as a value identical with initial values.

Further optionally, in the above method, before the step of, according to the starting position of the I/O request chain, setting an element corresponding to the starting position of the I/O request chain in an I/O state array as a value different from initial values of all positions, the method further comprises:

interacting with an intermediate software layer Hypervisor, and obtaining a handle of an I/O state array applied for by the intermediate software layer Hypervisor and a length of the I/O state array;

according to the handle of the applied-for I/O state array memory and the length of the I/O state array, mapping an address space of the I/O state array, to share a memory of the I/O state array with the intermediate software layer Hypervisor.

Further optionally, in the abovementioned method, after the step of, according to the starting position of the I/O request chain, setting an element corresponding to the starting position of the I/O request chain in an I/O state array as a value different from initial values of remaining positions, and before finishing processing the I/O request chain, the method further comprises:

after abnormality of the backend device of the Guest kernel suspends, and the backend device restarts and reconnects with the intermediate software layer Hypervisor, remapping an address space of the I/O state array and an address space of the I/O processing memory, to share the memory of the I/O state array with the intermediate software layer Hypervisor, and share the I/O processing memory with the frontend device of the Guest kernel;

obtaining, from the I/O request state array, the starting position of the I/O request chain processed when the abnormity suspends to re-process the I/O request chain in the I/O processing memory according to the starting position of the I/O request chain.

Further optionally, in the above method, after obtaining, from the I/O request state array, the starting position of the I/O request chain processed when the abnormity suspends to re-process the I/O request chain in the I/O processing memory according to the starting position of the I/O request chain, the method further comprises:

obtaining, from the I/O processing memory, an index tag of a first already-completed I/O request chain;

according to the index tag of the first already-completed I/O request chain, resetting the index tag of the I/O request chain already submitted locally and an index tag of a second already-completed I/O request chain.

Further optionally, in the above method, before the backend device of the Guest kernel beginning to process an I/O request chain submitted by a frontend device of the Guest kernel into a shared I/O processing memory, the method further comprises:

interacting with the intermediate software layer Hypervisor, and obtaining a handle of an I/O processing memory that is applied for by the intermediate software layer Hypervisor, a length of the I/O processing memory and a starting position of a virtual request queue in the I/O processing memory;

according to the handle of the applied-for I/O processing memory, the length of the I/O processing memory and the starting position of the virtual request queue in the I/O processing memory, mapping an address space of the I/O processing memory to share the I/O processing memory of the frontend device of the Guest kernel.

The present disclosure provides a backend device of a Guest kernel, the device comprising:

a position obtaining module configured to, upon beginning to process an I/O request chain submitted by a frontend device of the Guest kernel into a shared I/O processing memory, obtain a starting position of the I/O request chain from the I/O processing memory;

a setting module configured to, according to the starting position of the I/O request chain, set an element corresponding to the starting position of the I/O request chain in an I/O state array as a value different from initial values of all positions;

the setting module further configured to, upon finishing processing the I/O request chain, set an element corresponding to the starting position of the I/O request chain in the I/O request state array as a value identical with initial values.

Further optionally, the abovementioned device further comprises:

a memory information obtaining module configured to interacts with an intermediate software layer Hypervisor, and obtain a handle of an I/O state array applied for by the intermediate software layer Hypervisor and a length of the I/O state array;

a mapping module configured to, according to the handle of the applied-for I/O state array memory and the length of the I/O state array, map an address space of the I/O state array, to share a memory of the I/O state array with the intermediate software layer Hypervisor.

Further optionally, in the abovementioned device, the mapping module is further configured to, after abnormality of the backend device of the Guest kernel suspends, and the backend device restarts and reconnects with the intermediate software layer Hypervisor, remap an address space of the I/O state array and an address space of the I/O processing memory, to share the memory of the I/O state array with the intermediate software layer Hypervisor, and share the I/O processing memory with the frontend device of the Guest kernel;

the position obtaining module is further configured to obtain, from the I/O request state array, the starting position of the I/O request chain processed when the abnormity suspends to re-process the I/O request chain in the I/O processing memory according to the starting position of the I/O request chain.

Further optionally, the abovementioned device further comprises:

an index tag obtaining module configured to obtain, from the I/O processing memory, an index tag of a first already-completed I/O request chain;

a resetting module configured to, according to the index tag of the first already-completed I/O request chain, reset the index tag of the I/O request chain already submitted locally and an index tag of a second already-completed I/O request chain.

Further optionally, in the abovementioned device, the memory information obtaining module is further configured to interact with the intermediate software layer Hypervisor, and obtain a handle of an I/O processing memory that is applied for by the intermediate software layer Hypervisor, a length of the I/O processing memory and a starting position of a virtual request queue in the I/O processing memory;

the mapping module is further configured to, according to the handle of the applied-for I/O processing memory, the length of the I/O processing memory and the starting position of the virtual request queue in the I/O processing memory, map an address space of the I/O processing memory to share the I/O processing memory of the frontend device of the Guest kernel.

The present disclosure further provides a computer device, comprising:

one or more processors, a storage for storing one or more programs, the one or more programs, when executed by said one or more processors, enable said one or more processors to implement the abovementioned I/O request processing method in the virtual machine.

The present disclosure further provides a computer readable medium on which a computer program is stored, the program, when executed by a processor, implementing the abovementioned I/O request processing method in the virtual machine.

According to the I/O request processing method in the virtual machine, the device and the readable medium of the present disclosure, it is feasible to, when the backend device of the Guest kernel begins to process an I/O request chain submitted by the frontend device of the Guest kernel into a shared I/O processing memory, obtain a starting position of the I/O request chain from the I/O processing memory; according to the starting position of the I/O request chain, set an element corresponding to the starting position of the I/O request chain in an I/O state array as a value different from initial values of all positions; upon finishing processing the I/O request chain, set an element corresponding to the starting position of the I/O request chain in the I/O request state array as a value identical with initial values. It is possible to, by employing the above technical solution of the present embodiment, ensure synchronization of information of the frontend device of the Guest kernel and the backend device of the Guest kernel, and ensure continuation of the processing of the I/O request chain after recovery of the fault of interruption of the backend device of the Guest kernel, without causing the I/O processing to be hung.

BRIEF DESCRIPTION OF DRAWINGS

FIG. 3 is a diagram of an example of a Vring struct of FIG. 2.

FIG. 4 is a flow chart of a first embodiment of an I/O request processing method in a virtual machine according to the present disclosure.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
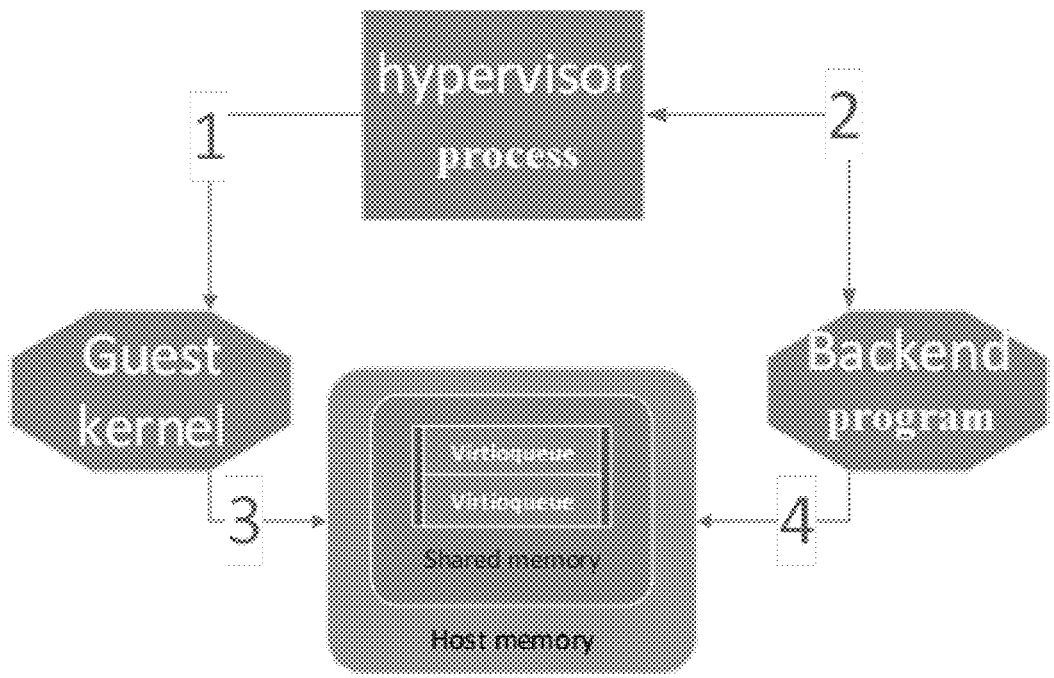
FIG. 1 is a diagram of architecture of I/O request processing in a virtual machine.

FIG. 1 is a diagram of architecture of I/O request processing in a virtual machine. The architecture shown in FIG. 1 is architecture of I/O request processing in current Vhost technology. According to the architecture shown in FIG. 1, a process of I/O request processing may specifically include the following steps:

1. Intermediate software, namely, Hypervisor process, applies for an I/O processing memory for a frontend of the Guest kernel, namely, the Guest kernel in FIG. 1 in a shmget manner. The Hypervisor process may record a handle of the applied-for I/O processing memory, a length of the I/O processing memory and a starting position of a virtual request queue (Virtio-queue) in the I/O processing memory, namely, the starting position of the Virtio-queue of the virtual machine that can be seen by the frontend of the Guest kernel;

2. The Hypervisor process creates a socket, and communicates with the backend of the Guest kernel, namely, a backend program in FIG. 1 so that the backend user state process, namely, backend program may obtain the handle of the applied-for I/O processing memory, the length of the I/O processing memory and the starting position of the Virtio-queue in the I/O processing memory; then the backend program may, in a mmap manner, map an address space of the I/O processing memory, and according to the starting position of the Virtio-queue in the I/O processing memory, locate the position of the Virtio-queue in the mapped address space of the I/O processing memory. As such, the frontend of the Guest kernel and the backend of the Guest kernel, namely, the Guest kernel and backend program in FIG. 1, can share the I/O processing memory, namely, a shared memory in a host memory in FIG. 1, wherein the Virtio-queue is located in the I/P processing memory, namely, in the shared memory in FIG. 1. When the frontend of the Guest kernel and the backend of the Guest kernel shares the shared memory, the frontend of the Guest kernel and the backend of the Guest kernel access the shared memory at different addresses, they both can access the shared memory and data structure in the Virtio-queue therein;

3. After the Guest kernel is activated, share the Virtio-queue in the shared memory, and write an I/O request chain in the Virtio-queue;

4. The backend program polls the Vring struct in the Virtio-queue, and performs processing for I/O request chains of newly-added Vrings.

The Vring struct is the most fundamental struct in a bottom layer of the Virtio-queue, and it is a carrier of data communication of each Virtio-queue. A virtual device may have a plurality of Virtio-queues.

Figure 2:
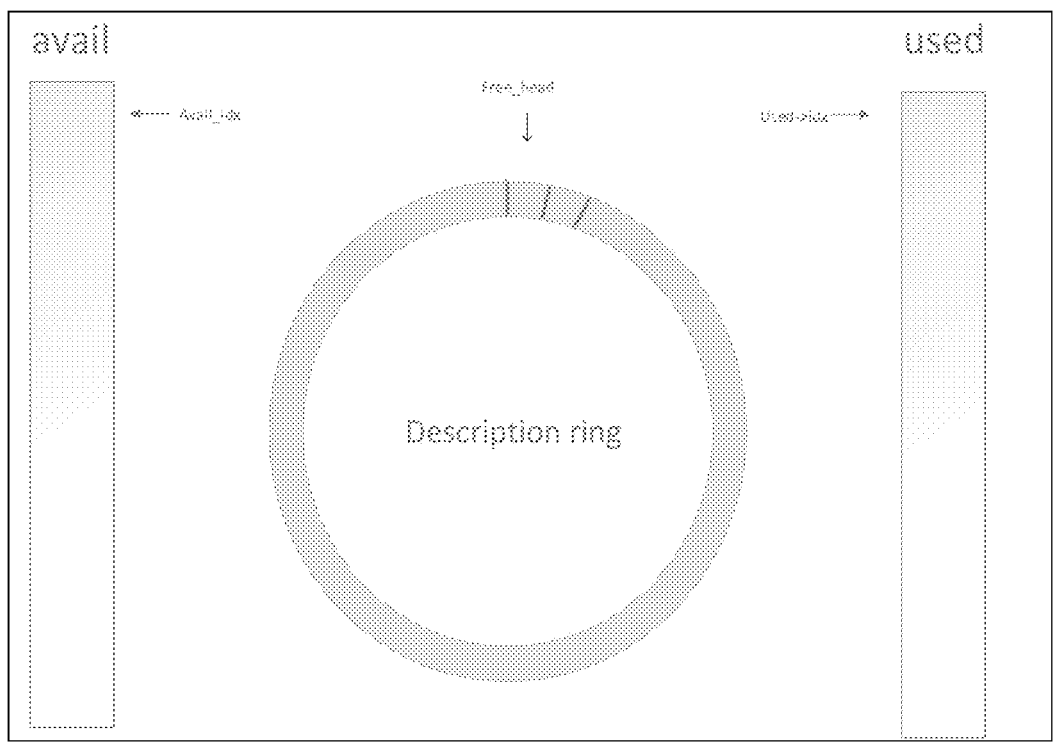
FIG. 2 is an abstract diagram of a Vring struct.

FIG. 2 is an abstract diagram of a Vring struct. As shown in FIG. 2, the Vring struct main includes three portions: a description ring (briefly Desc ring), an avail ring and a used ring respectively. The avail ring and used ring in FIG. 2 are respectively represented with an array, namely, avail array and used array.

The Desc ring is used to store information such as a physical starting address, a length and an offset of an I/O request chain in the bearing virtual machine. An I/O request usually needs to occupy a plurality of elements, and the elements are connected to one another via a next domain to form an I/O request chain. When the Desc ring stores three I/O request chains, for example, it is possible to store one I/O request chain at 0, $1^{st}$, $2^{nd}$ and third positions, store one I/O request chain at the fourth, fifth, sixth, seventh and eighth positions, and store one I/O request chain at the ninth, tenth, eleventh and twelfth positions At this time, free_head may point to the $13^{th}$ position to indicate next free position for storing the I/O request chain. The Desc ring may also be understood as an array, for example, the Desc ring may be an array with a length 128, namely, from the 0 position to the $127^{th}$ storage lattice. Each I/O request chain may include one or more I/O requests, and the plurality of elements of each I/O request occupies on storage lattice upon storage.

The avail array is used store a starting position in the Desc ring corresponding to the I/O request chain submitted by the Guest kernel. FIG. 3 is a diagram of an example of a Vring struct of FIG. 2. As shown in FIG. 3, the avail array respectively stores the starting positions of the first, second and third I/O request chains in the Desc ring, namely, respectively points to the first, second and third positions in the Dec ring. The avail array further records an index tag of an already-submitted I/O request chain, which may be called the index tag of the I/O request chain already submitted the first, and represented with Avail_idx. In the avail array, the Avail_idx points to a starting position of next free I/O request chain to be submitted. An initial value of Avail_idx is 0, the value of Avail_idx increases by 1 once the Guest kernel submits one I/O request chain. For example, in FIG. 3, the Guest kernel submitted three I/O request chains, whereupon the value of Avail_idx is equal to 3.

The used array is used to store a starting position of the I/O request chain upon completion of the processing of the Backend program; meanwhile, the used array further records an index tag of an already-completed I/O request, which may be called the index tag of the I/O request chain already completed the first, and represented with Used_idx. In the used array, the Used_idx points to a starting position of an I/O request chain to be completed next. An initial value of the Used_idx is 0, and the value of Used_idx increases by 1 once the Backend program finishes processing one I/O request chain. As shown in FIG. 3, the value of Used_idx may be equal to 2 at this time.

The Guest kernel may submit a plurality of I/O request chains to the Desc ring once, and the plurality of I/O request chains may at most fill the entire Desc ring. Meanwhile, the starting position of each I/O request chain may be filled in the avail array in turn.

Then, the Backend program, upon polling, processes each I/O request chain, but the order of completing the requests is not certainly in the order of submitting the requests. It is feasible to, upon completion of the I/O request chains, fill the starting positions of the completed I/O request chains into the used array in turn in the order of completion, and meanwhile, send interruption to the Guest kernel upon completion. As shown in FIG. 3, the figure shows completion of the processing of the I/O request chain whose starting position is at the $1^{st}$ position of the Desc ring, and the I/O request chain whose starting position is at the third position of the Desc ring. In addition, it needs to be appreciated that the processing of the I/O request chain at the first position and the I/O request chain at the third position in FIG. 3 is completed, the Desc ring releases a space at a corresponding position to store a new I/O request chain, and remaining free storage lattices are connected together to form a ring.

At the side of Guest kernel, namely, at the frontend side of the Guest kernel, when one I/O request is submitted into the Desc ring each time, a variable last_Avail_idx stored at the side of Guest kernel increases by 1, the variable last_Avail_idx is a index tag of the second already-submitted I/O request chain, and its initial value is 0. Meanwhile, the Avail_idx in the avail array in the Vring structure increases by 1. Likewise, the initial value of last_Avail_idx is 0.

In the Backend program, a last_Avail_idx variable is maintained, and the initial value of the variable last_Avail_idx is 0. The Backend program submits a to-be-processed I/O request chain each time, it increases the variable last_Avail_idx by 1, and begins to process the I/O request chain. When the value is compared with the Avail_idx in the avail array in Vring each time, it is feasible to find the starting position of the to-be-processed avail array through the difference of the two, and find the starting position of the to-be-processed I/O request chain through the values in the avail array.

In the Backend program, it is also feasible to store the index tag of the currently already-processed I/O request chain, namely, last_Used_idx, which may be called the index tag of the second already-completed I/O request chain, and, after one I/O request chain is completed each time, increase the value of the last_used_idx by 1 and increase the Used_idx in the Vring structure by 1. Likewise, the initial value of the last_Used_idx is also 0.

On the side of the Guest kernel, it is also feasible to maintain the variable last_Used_idx, complete positions in the Used array through comparison between the value and the Used_idx value in Vring, and return a processing result of a corresponding I/O request chain through the values in the used array.

Therefore, in the whole cooperation of the Guest kernel (namely, frontend of the Guest kernel) and the Backend program (namely, the backend of the Guest kernel), the Guest kernel submits the I/O request chains constantly, the Backend program processes the I/O request chains constantly, and each I/O request chain cannot be processed repeatedly, nor can it be missed in processing.

However, in this processing procedure, the order of the Backend program finishing processing the I/O request chains is not in the order of submitting the request chains, and instead, the I/O request chains are completed in disorder. For example, the I/O request chains submitted by the side of the Guest kernel are 1, 2, 3, so the avail array in the Vring stores the I/O request chains 1, 2, 3, the value of Avail_idx is 3, and the fourth position is pointed to. At this time, the Backend program completes two I/O request chains, namely I/O request chains 1 and 3, the value of Used_idx is 2, and the third position is pointed to. If the Backend program interrupts abnormally at this time, after reconnection, the last_avail_idx and last_used_idx of the backend program are both set as 2 (namely, point to the third position). Then, if the I/O request chain directly begins to be processed, the third I/O request chain is re-submitted again, but in fact, what needs to be processed is the second I/O request chain. Therefore, information asynchronization appears at the backend of the Guest kernel and the frontend of the Guest kernel, it is impossible to continue to process subsequent I/O request chains, so that the I/O processing is hung. With respect to the above problems, the present disclosure, based on the abovementioned current Vhost background, provides an I/O request processing solution in a virtual machine, to ensure information synchronization of the backend of the Guest kernel and frontend of Guest kernel so as to, after abnormal interruption and after reconnection, continue to processing subsequent I/O request chains and avoiding the hanging of the I/O processing.

FIG. 4 is a flow chart of a first embodiment of an I/O request processing method in a virtual machine according to the present disclosure. As shown in FIG. 4, the I/O request processing method in a virtual machine in the present embodiment may specifically comprise the following steps:

100: when a backend device of the Guest kernel begins to process an I/O request chain submitted by a frontend device of the Guest kernel into a shared I/O processing memory, obtain a starting position of the I/O request chain from the I/O processing memory;

The technical solution of the I/O request processing method in a virtual machine according to the present embodiment is described at the side of the backend device of the Guest kernel. The backend device of the Guest kernel of the present embodiment may be an integrated unit of the Backend program in the above FIG. 1, and the backend device of the Guest kernel and the frontend device of the Guest kernel share the I/O processing memory, for example, the shared memory shown in FIG. 1. The backend device of the Guest kernel and the frontend device of the Guest kernel both access a data structure of the Vring struct in the Virtio-queue in the I/O processing memory in FIG. 1.

In the present embodiment, the backend device of the Guest kernel and the frontend device of the Guest kernel share the I/O processing memory, and both may access the I/O processing memory. An example in taken in which the backend device of the Guest kernel begins to process a certain I/O request chain submitted by the frontend device of the Guest kernel into the shared I/O processing memory. At this time, the backend device of the Guest kernel may obtain the starting position of the I/O request chain from the I/O processing memory, for example, obtain the starting position of the I/O request chain in the Desc ring from the avail array in the Vring struct in the I/O processing memory.

101: according to the starting position of the I/O request chain, set an element corresponding to the starting position of the I/O request chain in an I/O state array as a value different from initial values of all positions;

102: upon finishing processing the I/O request chain, set an element corresponding to the starting position of the I/O request chain in an I/O request state array as a value identical with initial values.

In the present embodiment, after the backend device of the Guest kernel obtains the starting position of the I/O request chain which is currently being processed, it is feasible to set an element corresponding to the starting position of the I/O request chain in the I/O state array shared with the intermediate software layer Hypervisor as a value different from initial values of all positions. For example, for convenience purpose, it is feasible to set the initial values of all positions as 0, and set the element corresponding to the starting position of the I/O request chain in the shared I/O state array as 1; or set the initial values of all positions as 1, and set the element corresponding to the starting position of the I/O request chain in the I/O state array as 0; so long as it is possible to recognize the starting position of the I/O request chain which is currently being processed, as obtained the backend device of the Guest kernel. As shown in FIG. 1, if the length of the Desc ring is 128, the starting position of the I/O request chain may have 128 values, and correspondingly the length of the I/O state array may also be set as 128. Likewise, if the length of the Desc ring is 256 or other numbers, correspondingly the length of the I/O state array may also be 256 or other values at this time. For example, when the backend device of the Guest kernel submits the I/O request chain whose starting position is 1 in the Desc ring, the value of the first position in the I/O state array is 1, and the values at remaining positions all are zero. After the processing of all requests in the I/O request chain whose starting position is 1 in the Desc ring are completed, the value at the first position of the I/O state array is set as a value identical with initial value, namely, set as 0. The I/O state array in the present embodiment may also be called inflight array, and used to, according to the starting position of the I/O request chain in the Desc ring, identify the I/O request chain that is being processed by the backend device of the Guest kernel.

It needs to be appreciated that the backend device of the Guest kernel may submit a plurality of I/O request chains in turn, for example, may submit in turn I/O request chains whose initial positions are respectively 1, 2 and 3 in the Desc ring as shown in FIG. 3, whereupon the values of the first position, second position and third position of the I/O state array are all set as 1 in turn, and values at remaining positions all are 0. For example, in the state as shown in FIG. 3, when the processing of the I/O request chains whose initial positions are 1 and 3 respectively in the Desc ring is completed, values of the first position and third position of the I/O state array are set as 0 in turn, whereupon only the value of the second position in the I/O state array is 1, and values at remaining positions are 0. In the above example, one I/O request chain in the Desc ring occupies one position. In practical application, when one I/O request chain includes a plurality of requests, a plurality of positions may be occupied. For example, if the backend device of the Guest kernel may submit three I/O request chains in turn, for example, the first I/O request chain occupies the 0, first, second and third positions in the Desc ring, the second I/O request chain occupies the fourth, fifth, sixth, seventh and eighth positions in the Desc ring, and the third I/O request chain occupies the ninth, tenth, eleventh and twelfth positions in the Desc ring. When the backend device of the Guest kernel does not finish processing the three I/O request chains, the values of the 0 position, the fourth position and ninth position in the I/O state array are 1, and values at remaining positions are 0. If the processing of the first I/O request chain is completed, the 0 position is set as 0 at this time; likewise, if the processing of the second I/O request chain is completed, the fourth position is set as 0 at this time; if the processing of the third I/O request chain is completed, the ninth position is set as 0 at this time. No matter which position in the Desc ring the initial position of the I/O request chain is, the initial position of the I/O request chain that is being processed may be identified in the above manner. As such, it is possible to identify at every moment, in the I/O state array, a state of the I/O request chain that is being processed by the backend device of the Guest kernel. Even though the backend device of the Guest kernel interrupts abnormally while processing the I/O request chain, and after the backend device of the Guest kernel is restarted, it is still possible to, according to the identified initial position of the I/O request chain that is being processed in the I/O state array, determine the initial position of the I/O request chain that is being processed when the backend device of the Guest kernel interrupts. At this time, it is possible to continue to process the I/O request chain according to information of the I/O request chain that is being processed upon interruption, as recorded by the frontend device of the Guest kernel in the Ring struct, ensure continued processing of the I/O request chain, and prevent the I/O processing from being hung.

According to the I/O request processing method in the virtual machine in the present embodiment, it is feasible to, when a backend device of the Guest kernel begins to process an I/O request chain submitted by a frontend device of the Guest kernel into a shared I/O processing memory, obtain a starting position of the I/O request chain from the I/O processing memory; according to the starting position of the I/O request chain, set an element corresponding to the starting position of the I/O request chain in a shared I/O state array as a value different from initial values of all positions; upon finishing processing the I/O request chain, set an element corresponding to the starting position of the I/O request chain in the I/O request state array as a value identical with initial values. It is possible to, by employing the above technical solution of the present embodiment, ensure synchronization of information of the frontend device of the Guest kernel and the backend device of the Guest kernel, and ensure continuation of the processing of the I/O request chain after recovery of the fault of interruption of the backend device of the Guest kernel, without causing the I/O processing to be hung.

Figure 5:
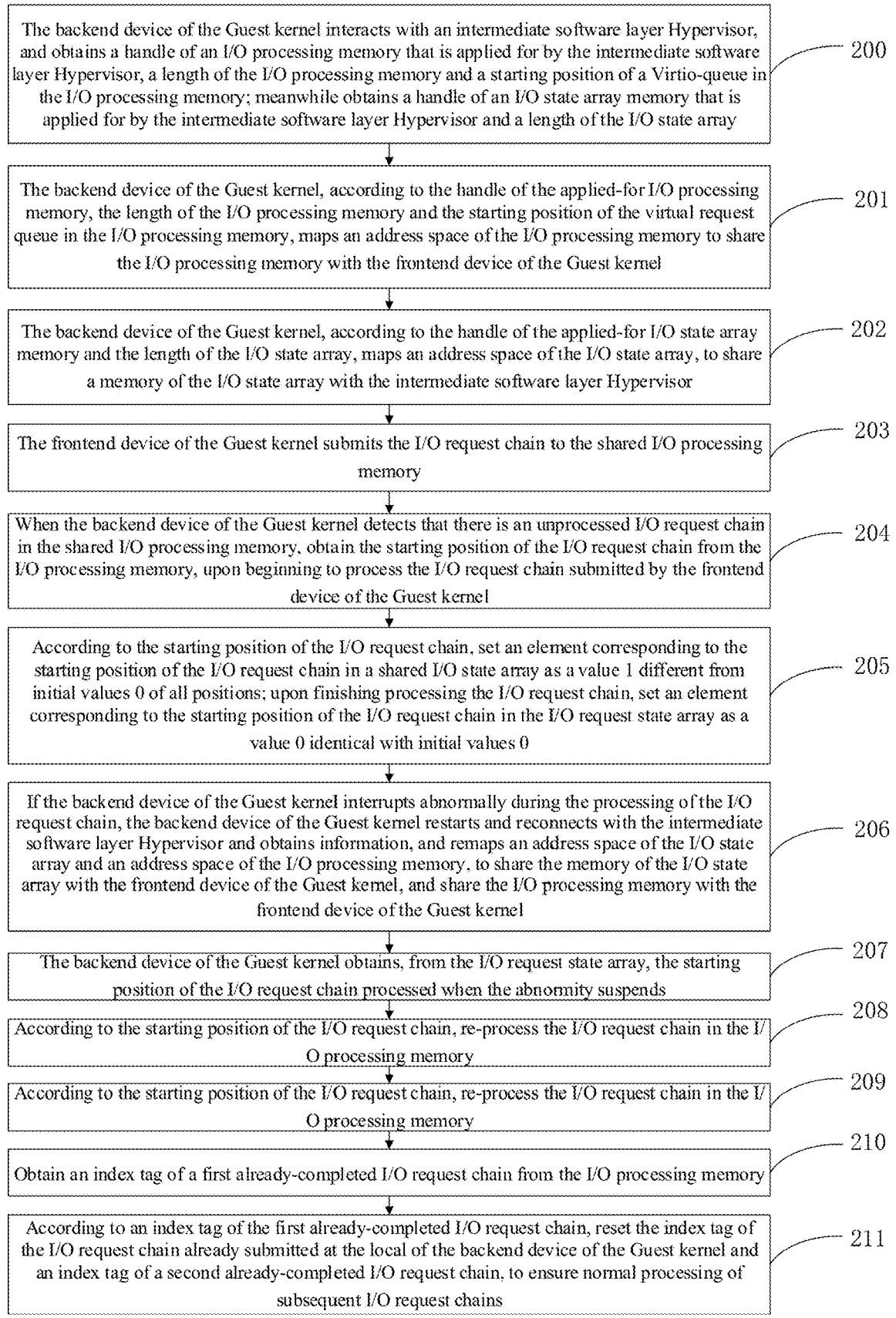
FIG. 5 is a flow chart of a second embodiment of an I/O request processing method in a virtual machine according to the present disclosure.

FIG. 5 is a flow chart of a second embodiment of an I/O request processing method in a virtual machine according to the present disclosure. As shown in FIG. 5, the I/O request processing method in a virtual machine of the present embodiment further introduce the technical solution of the present disclosure in more detail on the basis of the technical solution of the embodiment shown in FIG. 4. As shown in FIG. 5, the I/O request processing method in the virtual machine in the present embodiment may specifically comprise the following steps:

200: the backend device of the Guest kernel interacts with an intermediate software layer Hypervisor, and obtains a handle of an I/O processing memory that is applied for by the intermediate software layer Hypervisor, a length of the I/O processing memory and a starting position of a Virtio-queue in the I/O processing memory; meanwhile obtains a handle of an I/O state array memory that is applied for by the intermediate software layer Hypervisor and a length of the I/O state array;

Likewise, in the present embodiment, it is also the intermediate software layer Hypervisor that applies for the memory. Differently, in the present embodiment, while applying for the I/O processing memory, the intermediate software layer Hypervisor applies for an I/O state array memory. As such, when the backend device of the Guest kernel interacts with the intermediate software layer Hypervisor, the backend device of the Guest kernel not only obtains a handle of an I/O processing memory that is applied for by the intermediate software layer Hypervisor, a length of the I/O processing memory and a starting position of a Virtio-queue in the I/O processing memory, and meanwhile obtains a handle of an I/O state array memory that is applied for by the intermediate software layer Hypervisor and a length of the I/O state array. The most fundamental struct in Virtio-queue is Vring struct used to store information of the I/O request chain written by the frontend device of the Guest kernel, so that the backend device of the Guest kernel processes the I/O request chain in the Vring struct as written by the frontend device of the Guest kernel.

201: the backend device of the Guest kernel, according to the handle of the applied-for I/O processing memory, the length of the I/O processing memory and the starting position of the virtual request queue in the I/O processing memory, maps an address space of the I/O processing memory to share the I/O processing memory with the frontend device of the Guest kernel;

202: the backend device of the Guest kernel, according to the handle of the applied-for I/O state array memory and the length of the I/O state array, maps an address space of the I/O state array, to share a memory of the I/O state array with the intermediate software layer Hypervisor;

The sequential order of the above steps 201 and 202 is not limited, and they be performed simultaneously. Through step 201 and step 202, the frontend device of the Guest kernel and the backend device of the Guest kernel share the I/O processing memory, and they both may access the Vring struct in the Virtio-queue in the I/O processing memory, so that the frontend device of the Guest kernel writes the information of the I/O request chain in the Vring struct, and the backend device of the Guest kernel processes the I/O request chain written by the frontend device of the Guest kernel into the Vring struct. The backend device of the Guest kernel and the intermediate software layer Hypervisor share the memory of the I/O state array. When the backend device of the Guest kernel terminates abnormally, since the intermediate software layer Hypervisor operates normally, data in the I/O state array is still stored effectively.

203: the frontend device of the Guest kernel submits the I/O request chain to the shared I/O processing memory;

Specifically, it is feasible to, upon submitting one I/O request chain in the Desc ring each time, store in the avail array the starting position of the I/O request chain in the Desc ring, and meanwhile increase the value of the Avail_idx by 1, and meanwhile increase the value of the variable last_Avail_idx locally stored at the frontend device of the Guest kernel by 1.

204: When the backend device of the Guest kernel detects that there is an unprocessed I/O request chain in the shared I/O processing memory, obtain the starting position of the I/O request chain from the I/O processing memory upon beginning to process the I/O request chain submitted by the frontend device of the Guest kernel;

The I/O request chain is submitted first and then processed in the backend device of the Guest kernel. If the backend device of the Guest kernel detects that there is an unprocessed I/O request chain in the shared I/O processing memory, the I/O request chain is first submitted, whereupon the value of the variable last_Avail_idx maintained in the backend device of the Guest kernel increases by 1, and the I/O request chain begins to be processed. When the value is compared with the Avail_idx in the avail array in Vring each time, it is feasible to find the starting position of the to-be-processed avail array through the difference of the two, and find the starting position of the to-be-processed I/O request chain through the values in the avail array.

205: according to the starting position of the I/O request chain, set an element corresponding to the starting position of the I/O request chain in a shared I/O state array as a value 1 different from initial values 0 of all positions; upon finishing processing the I/O request chain, set an element corresponding to the starting position of the I/O request chain in the I/O request state array as a value 0 identical with initial values 0;

206: if the backend device of the Guest kernel interrupts abnormally during the processing of the I/O request chain, the backend device of the Guest kernel restarts and reconnects with the intermediate software layer Hypervisor and obtains information, and remaps an address space of the I/O state array and an address space of the I/O processing memory, to share the memory of the I/O state array with the frontend device of the Guest kernel, and share the I/O processing memory with the frontend device of the Guest kernel;

In the case the backend device of the Guest kernel exits abnormally during the running, information of the I/O state array, namely, inflight array is stored in the address space of the Hypervisor process. On the side of the Hypervisor, there should be logic for monitoring a socket communicating with the backend device of the Guest kernel. After the socket disconnects, it is believed that the backend user state program, namely, the backend device of the Guest kernel interrupts abnormally, and then retires requested by reconnection is activated.

After the backend user state program, namely, the backend device of the Guest kernel restarts, it will receive a reconnection request of the Hypervisor, whereupon the Hypervisor performs initialization again for device information corresponding to the backend user state program, wherein the address space information of the Guest kernel, the Virtio-queue address, and the address space information of the I/O state array, namely, inflight array are mainly involved.

Since the Hypervisor, together with the frontend device of the Guest kernel, operates all the way during the abnormal interruption of the backend device of the Guest kernel, the information of the Virtio-queue and I/O state array maintains the state at the moment when the backend device of the Guest kernel interrupts abnormally.

207: the backend device of the Guest kernel obtains, from the I/O request state array, the starting position of the I/O request chain processed when the abnormity suspends;

208: according to the starting position of the I/O request chain, re-process the I/O request chain in the I/O processing memory;

Based on the above, it is feasible to, after reconnection after interruption, obtain, from the I/O request state array, the starting position of the I/O request chain processed when the abnormity suspends; and re-process the I/O request chain in the I/O processing memory, and ensure correct execution of the I/O request chain. Reference may be made to the above depictions of relevant embodiments for a specific processing procedure. Not detailed depictions are presented any more here.

209: according to the starting position of the I/O request chain, re-process the I/O request chain in the I/O processing memory;

210: obtaining an index tag of a first already-completed I/O request chain from the I/O processing memory;

211: according to an index tag of the first already-completed I/O request chain, reset the index tag of the I/O request chain already submitted at the local of the backend device of the Guest kernel and an index tag of a second already-completed I/O request chain, to ensure normal processing of subsequent I/O request chains.

For example, it is specifically feasible to reset values of the index tag of the I/O request chain already submitted at the local of the backend device of the Guest kernel and the index tag of the second already-completed I/O request chain as the value of the index tag of the first already-completed I/O request chain.

That is to say, when the backend device of the Guest kernel initializes the Virtio-queue after restart, it is necessary to correct set the index tag last_Avail_idx of the I/O request chain already submitted at the local and the index tag last_Used_idx of the second already-completed I/O request chain. Since the I/O request chain is submitted and then processed, during the actual operation, the last_Avail_idx certainly precedes last_Used_idx. According to the above analysis, the index tag used_idx of the first already-completed I/O request chain in the Vring structure of the I/O processing memory is the position of the I/O request chain which is confirmed by the backend device of the Guest kernel and corresponds to the used array. Therefore, in the present embodiment, the backend device of the Guest kernel further needs to set last_Avail_idx and last_United_idx as the value of Used_idx in the Vring struct. As such, it is possible to ensure continued normal processing of subsequent I/O request chains.

Figure 6:
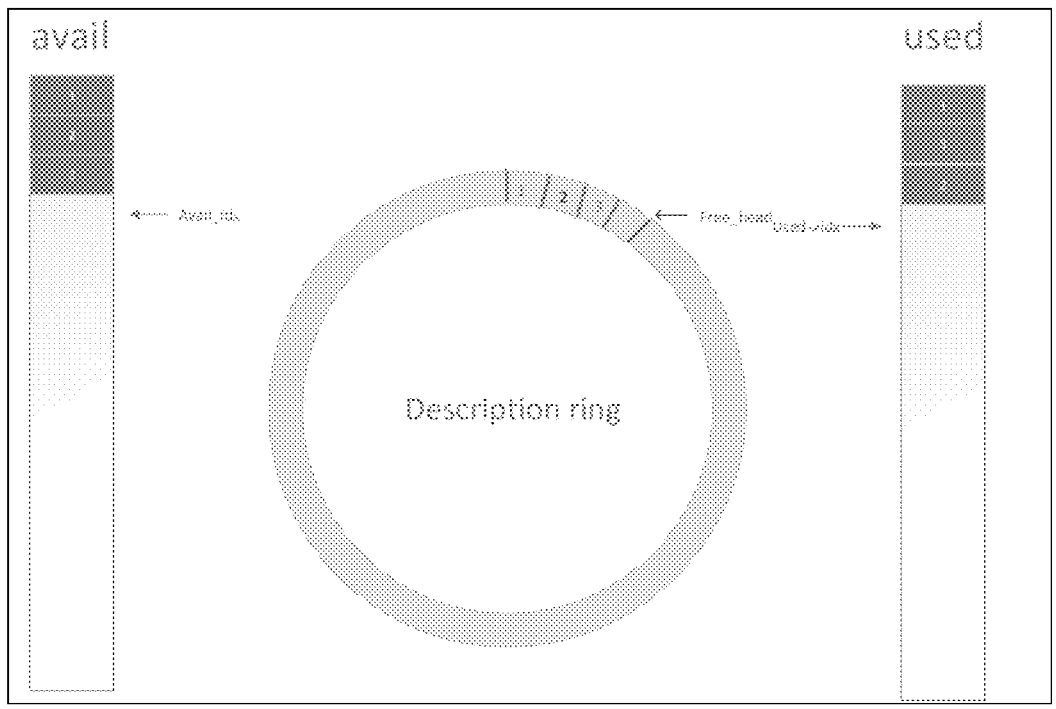
FIG. 6 is a diagram of another example of a Vring struct of FIG. 2.

FIG. 6 is a diagram of another example of a Vring struct of FIG. 2. If in the state stated in the above embodiment with reference to FIG. 3, since the backend device of the Guest kernel interrupts abnormally, the I/O state array retains the starting position of the I/O request chain 2 whose processing is not completed, it is necessary to scan the I/O state array one time before the backend device of the Guest kernel formally processes the I/O request chain, and then submit the not-yet-completed I/O request chain one time, and then continue to normally process subsequent I/O request chain.

For example, in the case shown in FIG. 3, it is feasible to, after the backend device of the Guest kernel finish sending the I/O request chain 2, add 1 to last_Avail_idx, and then, after the I/O request chain is completed, add 1 to last_Used_idx, right exiting abnormally before the processing of the I/O request chain 2 is completed.

When the backend device of the Guest kernel restores normal I/O request processing, as shown in FIG. 6, the state corresponds to the state of the Vring structure after the virtual machine just restarts, thereby achieving a purpose of restoring a normal working state of the I/O request processing without need to restart the virtual machine.

As compared with the conventional solution of restarting the virtual machine, the method of the present embodiment not only provides the function of the virtual machine automatically reconnecting the backend device of the Guest kernel, thereby omitting the necessity of restarting the virtual machine, but also can ensure no loss of the I/O request chain that is proceeding. After the backend device of the Guest kernel exits abnormally, it may be restarted in only several seconds to re-establish all information needed by the Virtio-queue communication before the abnormal exit. Therefore, implementation of the technical solution of the present embodiment can ensure quick upgrade of the backend user state program, namely, the backend device of the Guest kernel, without affecting the user's business and without losing user data, i.e., it is possible to complete quick upgrade of the user state program by temporarily interrupting the backend program, and then restarting a new backend user program. Regarding the Hypervisor process not supporting reconnection, modification of the backend user state process maintains backward compatibility.

It is possible to, by employing the above technical solution of the present embodiment, ensure synchronization of information of the frontend device of the Guest kernel and the backend device of the Guest kernel, and ensure continuation of the processing of the I/O request chain after recovery of the fault of interruption of the backend device of the Guest kernel, without causing the I/O processing to be hung.

Figure 7:
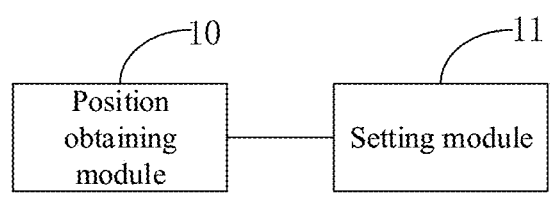
FIG. 7 is a structural diagram of a first embodiment of a backend device of a Guest kernel according to the present disclosure.

FIG. 7 is a structural diagram of a first embodiment of a backend device of a Guest kernel according to the present disclosure. As shown in FIG. 7, the backend device of the Guest kernel according to the present embodiment may specifically comprise:

a position obtaining module 10 configured to, upon beginning to process an I/O request chain submitted by a frontend device of the Guest kernel into a shared I/O processing memory, obtain a starting position of the I/O request chain from the I/O processing memory;

a setting module 11 configured to, according to the starting position of the I/O request chain obtained by the position obtaining module 10, set an element corresponding to the starting position of the I/O request chain in an I/O state array as a value different from initial values of all positions;

the setting module 11 further configured to, upon finishing processing the I/O request chain, set an element corresponding to the starting position of the I/O request chain in the I/O request state array as a value identical with initial values.

Principles employed by the backend device of the Guest kernel according to the present embodiment to implement the I/O request processing in the virtual machine with the above modules and the resultant technical effects are the same as those of the above-mentioned method embodiments. For particulars, please refer to the depictions of the aforesaid relevant method embodiments, and no detailed depictions will be presented here.

Figure 8:
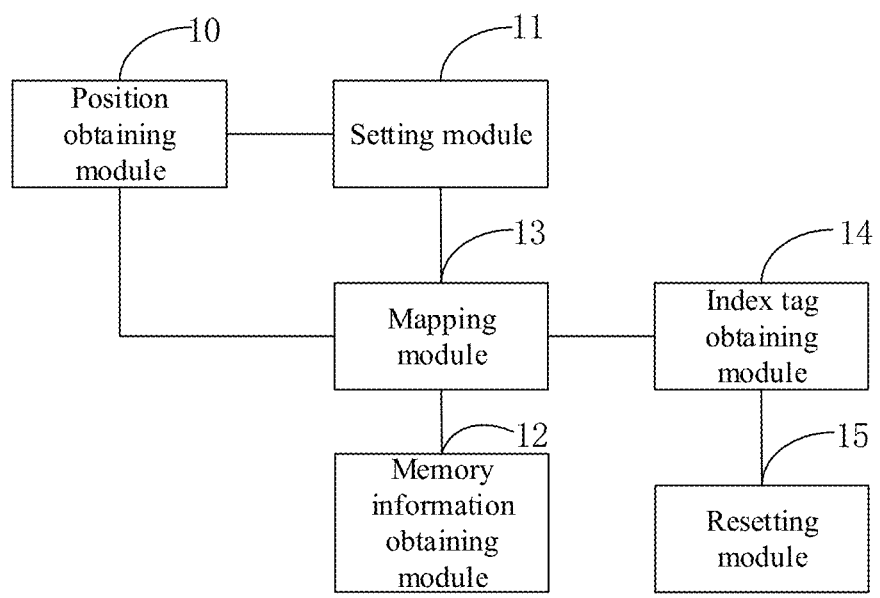
FIG. 8 is a structural diagram of a second embodiment of a backend device of a Guest kernel according to the present disclosure.

FIG. 8 is a structural diagram of a second embodiment of a backend device of a Guest kernel according to the present disclosure. As shown in FIG. 8, the backend device of the Guest kernel of the present embodiment further introduce the technical solution of the present disclosure in more detail on the basis of the technical solution of the embodiment shown in FIG. 7. As shown in FIG. 8, the backend device of the Guest kernel in the present embodiment may specifically comprise the following steps:

a memory information obtaining module 12 configured to interact with an intermediate software layer Hypervisor, and obtain a handle of an I/O state array applied for by the intermediate software layer Hypervisor and a length of the I/O state array;

a mapping module 13 configured to, according to the handle of the applied-for I/O state array memory and the length of the I/O state array obtained by the information obtaining module 12, map an address space of the I/O state array, to share a memory of the I/O state array with the intermediate software layer Hypervisor.

Correspondingly, the setting module 11 is further configured to, upon finishing processing the I/O request chain, set an element corresponding to the starting position of the I/O request chain in the I/O request state array mapped by the mapping module 13 as a value identical with an initial value.

Further optionally, in the backend device of the Guest kernel of the present embodiment, the mapping module 13 is further configured to, after abnormality of the backend device of the Guest kernel suspends, and the backend device reconnects with the intermediate software layer Hypervisor, remap an address space of the I/O state array and an address space of the I/O processing memory, to share the memory of the I/O state array with the intermediate software layer Hypervisor, and share the I/O processing memory with the frontend device of the Guest kernel;

the position obtaining module 10 is further configured to obtain, from the I/O request state array, the starting position of the I/O request chain processed when the abnormity suspends to re-process the I/O request chain in the I/O processing memory according to the starting position of the I/O request chain.

Further optionally, as shown in FIG. 8, the backend device of the Guest kernel of the present embodiment further comprises:

an index tag obtaining module 14 configured to obtain, from the I/O processing memory mapped by the mapping module 13, an index tag of a first already-completed I/O request chain;

a resetting module 15 configured to, according to the index tag of the first already-completed I/O request chain obtained by the index tag obtaining module 14, reset the index tag of the I/O request chain already submitted locally and an index tag of a second already-completed I/O request chain.

Further optionally, in the backend device of the Guest kernel of the present embodiment, the memory information obtaining module 12 is further configured to interact with an intermediate software layer Hypervisor, and obtain a handle of an I/O processing memory that is applied for by the intermediate software layer Hypervisor, a length of the I/O processing memory and a starting position of a virtual request queue in the I/O processing memory;

the mapping module 13 is further configured to, according to the handle of the applied-for I/O processing memory, the length of the I/O processing memory and the starting position of the virtual request queue in the I/O processing memory obtained by the memory information obtaining module 12, map an address space of the I/O processing memory to share the I/O processing memory of the frontend device of the Guest kernel.

Correspondingly, the positioning obtaining module 10 is configured to obtain the starting position of the I/O request chain from the I/O processing memory mapped by the mapping module 13, upon beginning to process the I/O request chain submitted by the frontend device of the Guest kernel to the shared I/O processing memory mapped by the mapping module 13.

In addition, it needs to be appreciated that the backend device of the Guest kernel of the present embodiment may further comprise a processing module of the I/O request chain to implement an operation such as processing the I/O request chain. Detailed description is not presented any more here.

Principles employed by the backend device of the Guest kernel according to the present embodiment to implement the I/O request processing in the virtual machine with the above modules and the resultant technical effects are the same as those of the above-mentioned method embodiments. For particulars, please refer to the depictions of the aforesaid relevant method embodiments, and no detailed depictions will be presented here.

Figure 9:
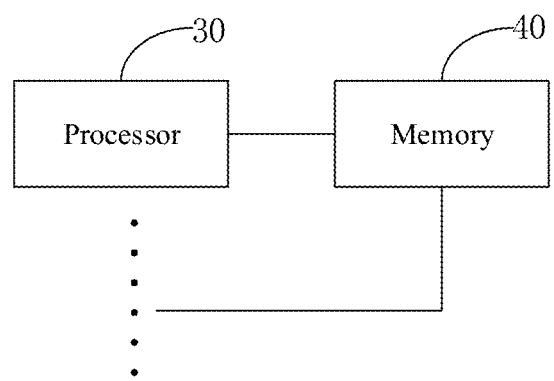
FIG. 9 is a block diagram of an embodiment of a computer device according to the present disclosure.

FIG. 9 is a block diagram of an embodiment of a computer device according to the present disclosure. As shown in FIG. 9, the computer device according to the present embodiment comprises: one or more processors 30, and a memory 40 for storing one or more programs; the one or more programs stored in the memory 40, when executed by said one or more processors 30, enable said one or more processors 30 to implement the I/O request processing method in the virtual machine in embodiments shown in FIG. 4-FIG. 5. The embodiment as shown in FIG. 9 exemplarily includes a plurality of processor 30. That is, the computer device of the present embodiment may perform the function of the backend device of the Guest kernel in the above embodiment.

Figure 10:
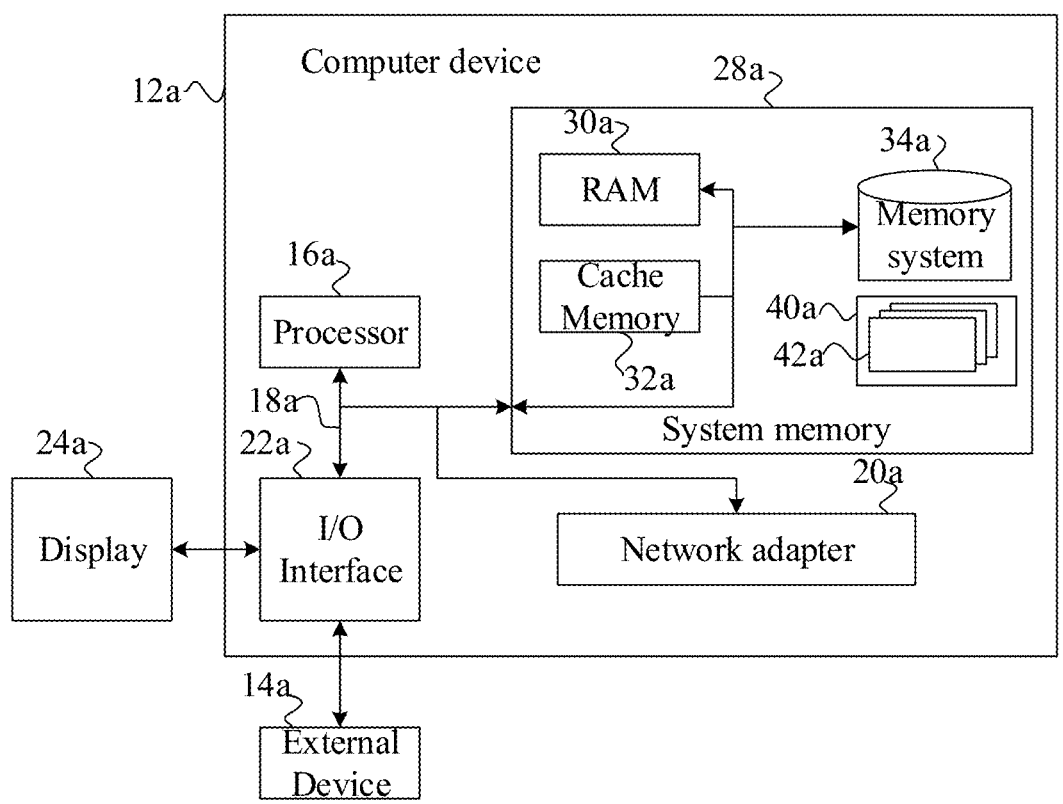
FIG. 10 is an example diagram of a computer device according to the present disclosure.

For example, FIG. 10 is an example diagram of a computer device according to an embodiment of the present disclosure. FIG. 10 shows a block diagram of an example computer device 12a adapted to implement an implementation mode of the present disclosure. The computer device 12a shown in FIG. 10 is only an example and should not bring about any limitation to the function and scope of use of the embodiments of the present disclosure.

As shown in FIG. 10, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 10 and typically called a "hard drive"). Although not shown in FIG. 10, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 4-FIG. 8 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 4-FIG. 8 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 10, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the I/O request processing method in the virtual machine in the above embodiments.

The present disclosure further provides a computer readable medium on which a computer program is stored, the program, when executed by a processor, implementing the I/O request processing method in the virtual machine shown in the above embodiments.

The computer readable medium of the present embodiment may include RAM 30a, and/or cache memory 32a and/or a storage system 34a in the system memory 28a in the embodiment shown in FIG. 5.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An I/O request processing method in a virtual machine, wherein the method comprises:
when a backend device of a Guest kernel begins to process an I/O request chain submitted by a frontend device of the Guest kernel into a shared I/O processing memory, obtaining a starting position of the I/O request chain in the shared I/O processing memory;
according to the starting position of the I/O request chain, setting an element corresponding to the starting position of the I/O request chain in an I/O state array as a value different from initial values of all positions;

upon finishing processing the I/O request chain, setting the element corresponding to the starting position of the I/O request chain in the I/O state array as a value identical with initial values, wherein after the step of, according to the starting position of the I/O request chain, setting an element corresponding to the starting position of the I/O request chain in an I/O state array as a value different from initial values of remaining positions, and before finishing processing the I/O request chain, the method further comprises:

after abnormality of the backend device of the Guest kernel suspends, and the backend device restarts and reconnects with the intermediate software layer Hypervisor, remapping an address space of the I/O state array and an address space of the I/O processing memory, to share the memory of the I/O state array with the intermediate software layer Hypervisor, and share the I/O processing memory with the frontend device of the Guest kernel;

obtaining, from the I/O request state array, the starting position of the I/O request chain processed when the abnormity suspends to re-process the I/O request chain in the I/O processing memory according to the starting position of the I/O request chain, and wherein after obtaining, from the I/O request state array, the starting position of the I/O request chain processed when the abnormity suspends to re-process the I/O request chain in the I/O processing memory according to the starting position of the I/O request chain, the method further comprises:

obtaining, from the I/O processing memory, an index tag of a first already-completed I/O request chain;

according to the index tag of the first already-completed I/O request chain, resetting the index tag of the I/O request chain already submitted locally and an index tag of a second already-completed I/O request chain, to ensure normal processing of subsequent I/O request chain.

2. The method according to claim 1, further comprises:

interacting with an intermediate software layer Hypervisor, and obtaining a handle of an I/O state array applied for by the intermediate software layer Hypervisor and a length of the I/O state array before setting an element corresponding to the starting position of I/O state array as a value different from initial values of all positions according to the starting position of the I/O request chain;

according to the handle of the applied-for I/O state array memory and the length of the I/O state array, mapping an address space of the I/O state array, to share a memory of the I/O state array with the intermediate software layer Hypervisor.

3. The method according to claim 1, further comprises:

interacting with the intermediate software layer Hypervisor, and obtaining a handle of an I/O processing memory that is applied for by the intermediate software layer Hypervisor, a length of the I/O processing memory and a starting position of a virtual request queue in the I/O processing memory before the backend device of the Guest kernel beginning to process an I/O request chain submitted by a frontend device of the Guest kernel into a shared I/O processing memory;

according to the handle of the applied-for I/O processing memory, the length of the I/O processing memory and the starting position of the virtual request queue in the I/O processing memory, mapping an address space of the I/O processing memory to share the I/O processing memory of the frontend device of the Guest kernel.

4. A computer device, wherein the computer device comprises:

one or more processors, a storage for storing one or more programs, the one or more programs, when executed by said one or more processors, enable said one or more processors to implement an I/O request processing method in a virtual machine, wherein the I/O request processing method comprises:

when a backend device of a Guest kernel begins to process an I/O request chain submitted by a frontend device of the Guest kernel into a shared I/O processing memory, obtaining a starting position of the I/O request chain in the I/O processing memory;

according to the starting position of the I/O request chain, setting an element corresponding to the starting position of the I/O request chain in an I/O state array as a value different from initial values of all positions;

upon finishing processing the I/O request chain, setting the element corresponding to the starting position of the I/O request chain in the I/O state array as a value identical with initial values, wherein after the step of, according to the starting position of the I/O request chain, setting an element corresponding to the starting position of the I/O request chain in an I/O state array as a value different from initial values of remaining positions, and before finishing processing the I/O request chain, the method further comprises:

after abnormality of the backend device of the Guest kernel suspends, and the backend device restarts and reconnects with the intermediate software layer Hypervisor, remapping an address space of the I/O state array and an address space of the I/O processing memory, to share the memory of the I/O state array with the intermediate software layer Hypervisor, and share the I/O processing memory with the frontend device of the Guest kernel;

obtaining, from the I/O request state array, the starting position of the I/O request chain processed when the abnormity suspends to re-process the I/O request chain in the I/O processing memory according to the starting position of the I/O request chain, and wherein after obtaining, from the I/O request state array, the starting position of the I/O request chain processed when the abnormity suspends to re-process the I/O request chain in the I/O processing memory according to the starting position of the I/O request chain, the method further comprises:

obtaining, from the I/O processing memory, an index tag of a first already-completed I/O request chain;

according to the index tag of the first already-completed I/O request chain, resetting the index tag of the I/O request chain already submitted locally and an index tag of a second already-completed I/O request chain, to ensure normal processing of subsequent I/O request chain.

5. The computer device according to claim 4, the I/O request processing method further comprises:

interacting with an intermediate software layer Hypervisor, and obtaining a handle of an I/O state array applied for by the intermediate software layer Hypervisor and a length of the I/O state array before the step of, according to the starting position of the I/O request chain, setting an element corresponding to the starting position of the I/O request chain in an I/O state array as a value different from initial values of all positions;

according to the handle of the applied-for I/O state array memory and the length of the I/O state array, mapping an address space of the I/O state array, to share a memory of the I/O state array with the intermediate software layer Hypervisor.

6. The computer device according to 4, the I/O request processing method further comprises:

interacting with the intermediate software layer Hypervisor, and obtaining a handle of an I/O processing memory that is applied for by the intermediate software layer Hypervisor, a length of the I/O processing memory and a starting position of a virtual request queue in the I/O processing memory before the backend device of the Guest kernel beginning to process an I/O request chain submitted by a frontend device of the Guest kernel into a shared I/O processing memory;

according to the handle of the applied-for I/O processing memory, the length of the I/O processing memory and the starting position of the virtual request queue in the I/O processing memory, mapping an address space of the I/O processing memory to share the I/O processing memory of the frontend device of the Guest kernel.

7. A non-transitory computer readable medium on which a computer program is stored, wherein the program, when executed by a processor, implements an I/O request processing method in a virtual machine, wherein the I/O request processing method comprises:

when a backend device of a Guest kernel begins to process an I/O request chain submitted by a frontend device of the Guest kernel into a shared I/O processing memory, obtaining a starting position of the I/O request chain in the I/O processing memory;

according to the starting position of the I/O request chain, setting an element corresponding to the starting position of the I/O request chain in an I/O state array as a value different from initial values of all positions;

upon finishing processing the I/O request chain, setting the element corresponding to the starting position of the I/O request chain in the I/O state array as a value identical with initial values, wherein after the step of, according to the starting position of the I/O request chain, setting an element corresponding to the starting position of the I/O request chain in an I/O state array as a value different from initial values of remaining positions, and before finishing processing the I/O request chain, the method further comprises:

after abnormality of the backend device of the Guest kernel suspends, and the backend device restarts and reconnects with the intermediate software layer Hypervisor, remapping an address space of the I/O state array and an address space of the I/O processing memory, to share the memory of the I/O state array with the intermediate software layer Hypervisor, and share the I/O processing memory with the frontend device of the Guest kernel;

obtaining, from the I/O request state array, the starting position of the I/O request chain processed when the abnormity suspends to re-process the I/O request chain in the I/O processing memory according to the starting position of the I/O request chain, and wherein after obtaining, from the I/O request state array, the starting position of the I/O request chain processed when the abnormity suspends to re-process the I/O request chain in the I/O processing memory according to the starting position of the I/O request chain, the method further comprises:

obtaining, from the I/O processing memory, an index tag of a first already-completed I/O request chain;

according to the index tag of the first already-completed I/O request chain, resetting the index tag of the I/O request chain already submitted locally and an index tag of a second already-completed I/O request chain, to ensure normal processing of subsequent I/O request chain.

8. The non-transitory computer readable medium according to claim 7, the I/O request processing method further comprises:

interacting with an intermediate software layer Hypervisor, and obtaining a handle of an I/O state array applied for by the intermediate software layer Hypervisor and a length of the I/O state array according to the starting position of the I/O request chain, setting an element corresponding to the starting position of the I/O request chain in an I/O state array as a value different from initial values of all positions;

according to the handle of the applied-for I/O state array memory and the length of the I/O state array, mapping an address space of the I/O state array, to share a memory of the I/O state array with the intermediate software layer Hypervisor.

9. The non-transitory computer device according to 7, the I/O request processing method further comprises:

interacting with the intermediate software layer Hypervisor, and obtaining a handle of an I/O processing memory that is applied for by the intermediate software layer Hypervisor, a length of the I/O processing memory and a starting position of a virtual request queue in the I/O processing memory before the backend device of the Guest kernel beginning to process an I/O request chain submitted by a frontend device of the Guest kernel into a shared I/O processing memory;

according to the handle of the applied-for I/O processing memory, the length of the I/O processing memory and the starting position of the virtual request queue in the I/O processing memory, mapping an address space of the I/O processing memory to share the I/O processing memory of the frontend device of the Guest kernel.

* * * * *